Dec. 28, 1965 R. H. TERLET 3,226,553

PHOTOSENSITIVE MULTIPLE STATE CIRCUIT FOR COMPUTING AND DATA PROCESSING SYSTEMS

Filed July 24, 1961 2 Sheets-Sheet 1

INVENTOR
RENÉ H. TERLET
BY Curtis Ailes Jr.
ATTORNEY

Dec. 28, 1965 R. H. TERLET 3,226,553

PHOTOSENSITIVE MULTIPLE STATE CIRCUIT FOR COMPUTING AND DATA PROCESSING SYSTEMS

Filed July 24, 1961 2 Sheets-Sheet 2

3,226,553
PHOTOSENSITIVE MULTIPLE STATE CIRCUIT FOR COMPUTING AND DATA PROCESSING SYSTEMS

Rene H. Terlet, Ossining, N.Y., assignor to International Business Machines Corporation, New York, N.Y., a corporation of New York Filed July 24, 1961, Ser. No. 126,188
15 Claims. (Cl. 250—209)

Figure 1:
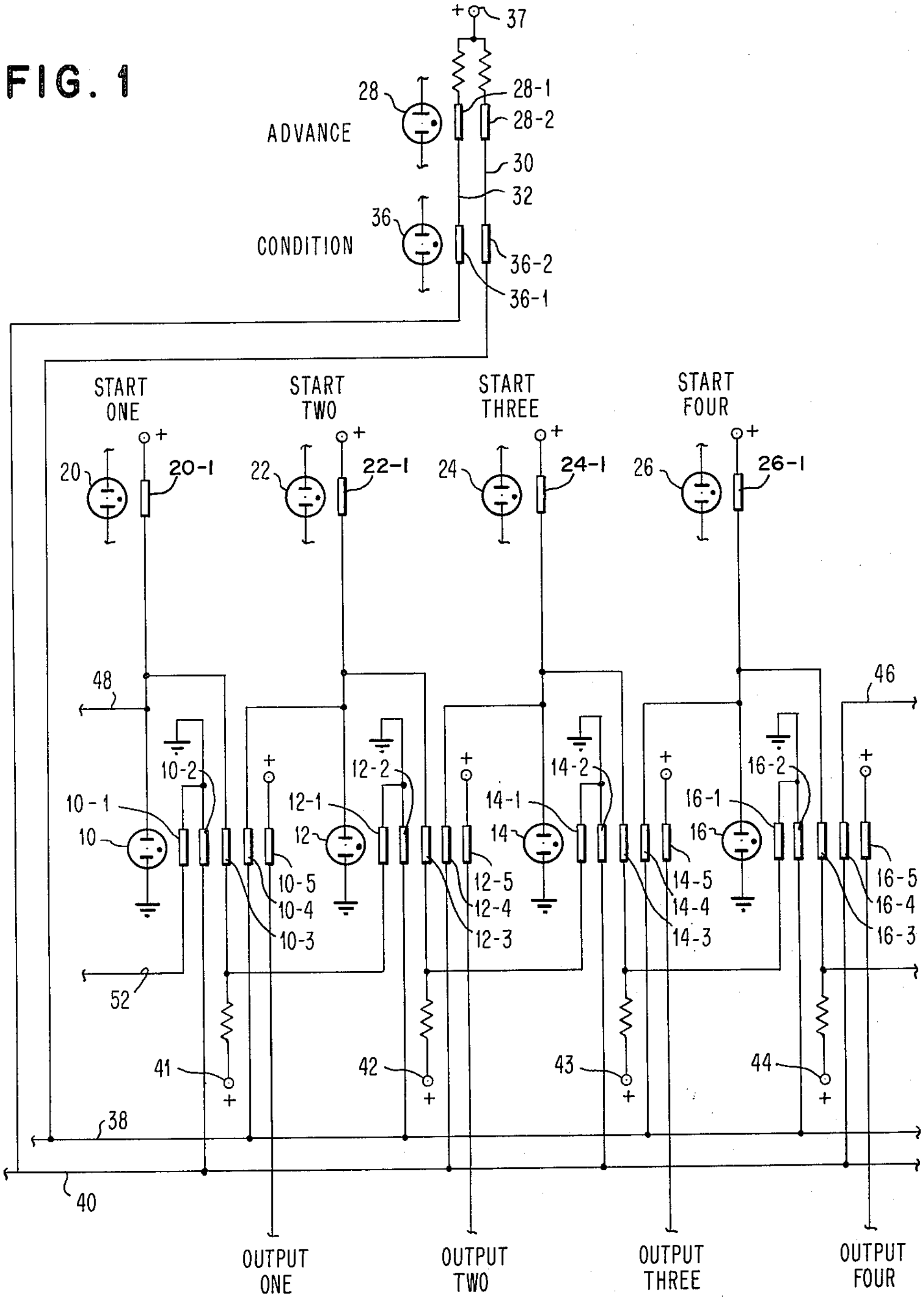

This invention relates to multiple state circuit apparatus. This invention further relates to multiple state circuit apparatus such as bistable circuits or ring circuits which are particularly well adapted for embodiment in simple four terminal switching devices such as combinations of lamps and photoconductors.

Step switching devices and ring circuits which are capable of advancing one step or position each time a pulse is received have long been used in various automatic switching systems such as telephone systems and computing and data processing systems. Such devices or circuits are generally useful for the control of the operations of other devices and circuits within the system.

Accordingly, it is an object of this invention to provide this essential function by means of a circuit which is very simple and inexpensive.

Another object of this invention is to provide a multiple state circuit employing inexpensive components which is characterized by very positive and reliable operation.

Another object of this invention is to provide a multiple state circuit employing inexpensive components which is characterized by very positive and reliable operation.

Another object of the present invention is to provide an improved multiple state circuit of the above description in which specific apparatus is provided for the prevention of an erroneous double advance when only a single advance is called for.

Certain prior multiple state and ring circuits, and particularly those employing inexpensive components, have incorporated capacitors for the purpose of enhancing the switching operation of the ring. While capacitors are very useful components in many circuits, they are an additional source of circuit failure, and they are expensive.

Accordingly, it is an object of this invention to provide a multiple state circuit which is simplified and made less expensive by the elimination of any need for capacitors.

Many ring circuits are designed to be started for every series of operations at the same ring position, but it is advantageous for many systems employing ring circuits to have the capability of starting the ring at other positions also.

Accordingly, it is another object of the present invention to provide a ring circuit which may be started at any desired position of the ring.

Another object of the present invention is to provide a multiple state circuit which may be embodied in simple four terminal devices such as lamp and photoconductor combinations in which it is not necessary for any of the photoconductors to be arranged to receive light from more than one light source.

Another object of the present invention is to provide a ring circuit of the above description which may be embodied in lamp photoconductor components and in which each ring position has at least one lamp device and in which it is not necessary to provide a separate commutator or flip flop to drive successive ring positions in order to insure positive ring operation.

In carrying out the above objects of this invention in one preferred embodiment thereof, a multiple state circuit is provided which includes a storage device for each state. At least two advance pulse lines are connected and arranged to be simultaneously energized to supply advance pulse signals to the circuit whenever an advance from one state to another state is required. Each of the storage devices includes a pick-up switch element connected from one of the advance lines to energize the next succeeding storage device and switch elements for disabling the other advance lines.

For a more complete understanding of the invention and for an appreciation of other objects and advantages thereof, attention is directed to the following specification and the accompanying drawings which are briefly described as follows:

FIG. 1 is a schematic circuit diagram of a preferred lamp photoconductor embodiment of a ring circuit in accordance with the present invention.

Figure 2:
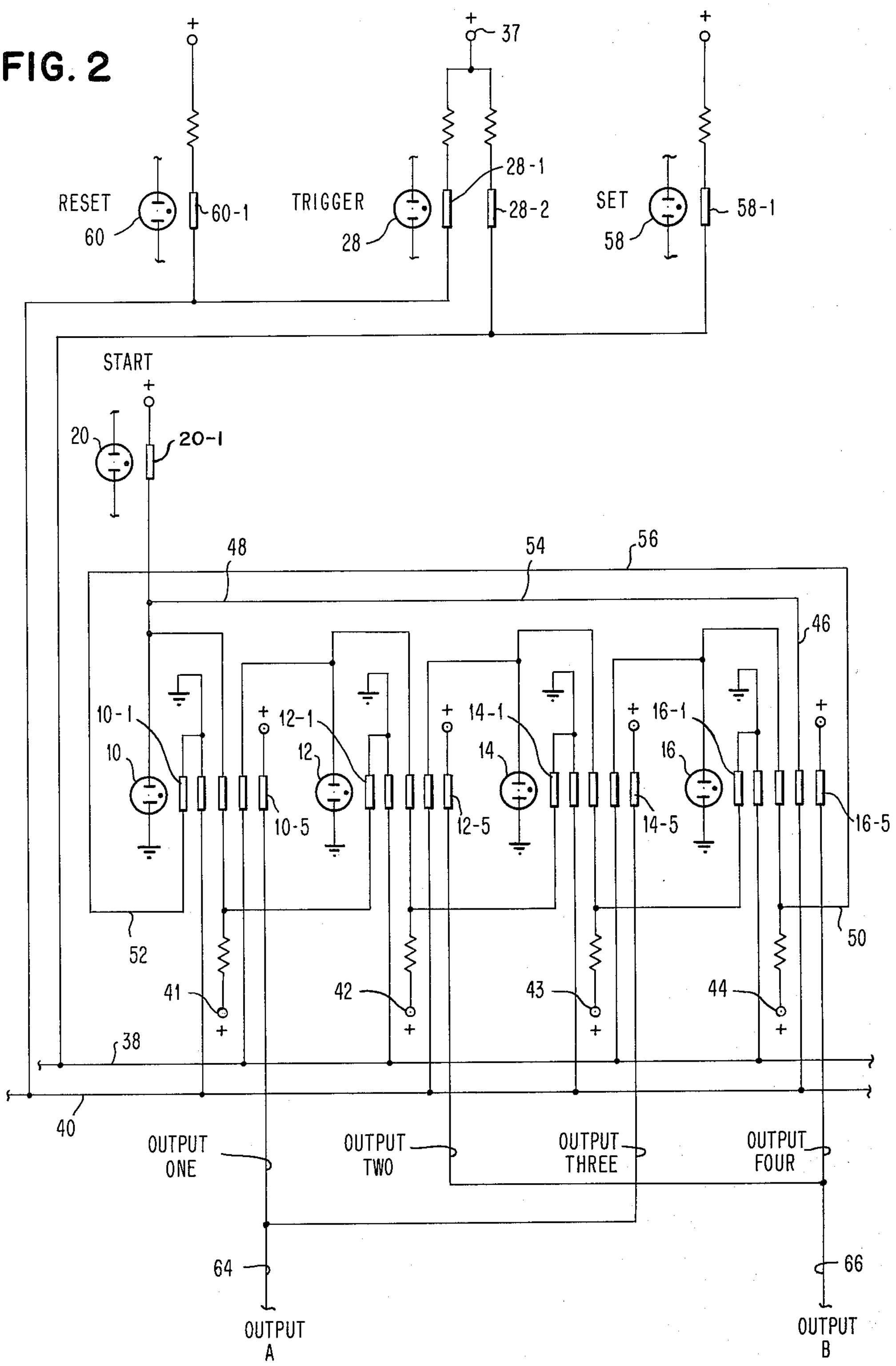

And FIG. 2 is a schematic circuit diagram of a preferred lamp photoconductor embodiment of a bi-stable or flip-flop circuit in accordance with the present invention.

Referring particularly to FIG. 1, the circuit includes a ring position storage device for each ring position in the form of lamps 10, 12, 14 and 16, only one of which is latched on at each step of operation of the ring. A starting device is provided for starting the ring at each ring position as indicated at 20, 22, 24, and 26.

An advance pulse device in the form of lamp 28 is provided for the purpose of receiving advance pulse signals and for generating advance pulses simultaneously on advance lines 30 and 32. In order for these advance line signals to be effective a "condition" lamp 36 must be maintained in an illuminated condition. This condition lamp normally will be illuminated, but under conditions where the ring must not be advanced, the condition lamp will be extinguished to prevent any such advance from occurring.

The advance pulses are generated on advance lines 30 and 32 by the illumination of photoconductors 28–1 and 28–2 by advance lamp 28. These photoconductors achieve a low impedance condition when illuminated to provide a voltage from a standard voltage supply source indicated at terminal 37.

The control by the lamp 36 is established by means of photoconductors 36–1 and 36–2 which are associated with the lamp 36 and illuminated thereby. The photoconductors 36–1 and 36–2 are in a low resistance or conductive state when illuminated and they thus form an extension respectively of the drive line 32 and 30 to drive lines buses indicated at the bottom of the drawing at 38 and 40.

Throughout the drawing, the small rectangular symbols such as are used for photoconductors 36–1 and 36–2 signify devices which have photo responsive properties which are commonly referred to as photoconductors. Since they are devices which have a lowered impedance when they are illuminated, they are more accurately described as photo responsive impedance devices, but the popular "photoconductor" term is used in this specification. The preferred photoconductor devices will be described more fully below. Throughout the drawing the convention is followed that each photoconductor device is to be illuminated only by the first lamp positioned to the left of that photoconductor in the drawing. Thus, both photoconductors 36–1 and 36–2 are illuminated only by lamp 36.

Each of the starting lamp devices 20, 22, 24, 26 has associated therewith one photoconductor as indicated at 20–1 22–1, 24–1, 26–1. Each of these photoconductors is connected at one end to a conventional source of power as indicated by a terminal symbol and a "+" sign. Similarly, each of the ring position storage device lamps 10 through 16 has associated therewith switch element photoconductors 10–1, 10–2, 10–3, 10–4 and 10–5 through 16–1, 16–2, 16–3, 16–4 and 16–5.

The photoconductors 10–3, 12–3, 14–3 and 16–3 are operable for the purpose of latching on the associated storage device lamps. The photoconductors 10–4, 12–4, 14–4, and 16–4 are referred to below as "pick-up" switch elements as they are conditioned by their associated lamps for the purpose of picking up the following ring stage lamp and causing it to be illuminated. In this specification, the term "pick-up" will be used in this connection to refer to the energization of these ring position storage device lamps.

The photoconductors at 10–1, 12–1, 14–1, and 16–1 are each operable, when illuminated, for shunting out the latch circuit of the preceding storage device for the purpose of turning it off. The photoconductors 10–2, 12–2, 14–2 and 16–2 are each provided for the purpose of shunting one of the advance lines to ground. It will be observed from the various connections of these photoconductors that the advance line buses are alternately shunted to ground as the operation of the ring progresses from position to position.

The photoconductors 10–5, 12–5, 14–5, and 16–5 are provided as usable output switch elements. It will be appreciated that additional usable output switch elements may be provided if desired.

A detailed description of the operation of the system is as follows: Assuming it is desired to start the ring at the second ring position, "Start Two" lamp 22 is then illuminated, which through its photoconductor causes the energization of the second position lamp 12. The resultant illumination reduces the impedance of photoconductor 12–3 so as to connect latching power to lamp 12 from the source indicated by terminal 42. Lamp 12 thus remains energized and latched on even after the start pulse energization from lamp 33 subsides.

With position two storage device lamp 12 in an illuminated condition, photoconductor 12–2 shunts advance line bus 38 to ground while photoconductor 12–4 connects advance line bus 40 to the next ring stage storage device lamp 14. Accordingly, if an advance pulse of energy is applied to advance lamp 28, and if the condition lamp 36 is also on, an advance pulse signal is supplied through the photoconductor 12–4 to cause the illumination of the third stage lamp 14 which latches itself on through latching photoconductor 14–3. The illumination of photoconductor 14–1 places a shunt connection across the latch circuit of lamp 12 provided by the latching photoconductor 12–3 so as to cause the position two storage device lamp 12 to shunt off. Despite the fact that lamp 12 is turning lamp 14 on, and lamp 14 is turning lamp 12 off, the switching action is positive and foolproof because the "turn-on" time characteristic of the photoconductors is faster than the turn off time characteristic. Thus, the photoconductor 14–3 latches lamp 14 on quite effectively before the lamp 12 is actually turned off.

The illumination of photoconductor 14–4 might be expected to cause the pick up of the second succeeding stage storage lamp 16 because both advance line buses 38 and 40 are energized. However, because of the fact that photoconductor 12–2 maintains advance bus 38 shunted to ground, there is no substantial voltage available on bus 38 during the period of duration of the advance pulse, and accordingly a double advance to the fourth ring position is prevented.

When the next advance pulse is received, the advance bus line 40 is shunted to ground through photoconductor 14–2 and the fourth position storage device lamp 16 is picked up through photoconductor 14–4 from advance line bus 38. In this manner the ring progresses one position at a time for each advance pulse received. It will be appreciated, however, that the advance pulses must be of a controlled duration sufficient to cause a succeeding ring position storage device lamp to pick up. Otherwise, if the pulse is long enough for the advance bus shunt to become ineffective, the second advance bus may rise in voltage and a progression to the second succeeding ring position may result.

While only four stages of this ring are illustrated, it is quite apparent that the ring circuit may be extended to provide as many stages as are required, the circuitry for each of the odd numbered stages being as shown for odd stages one and three, and the circuitry for the even numbered stages being the same as for stages two and four. It is apparent also that the ring may be caused to recirculate, if desired, as long as the last stage is an even stage. This is done by connecting the pick up output line from the last stage to pick up the first stage lamp 10. Thus, for instance, the ring with only four stages as shown may be connected for recirculation by connecting the pick up output from photoconductor 16–4, as indicated at 46, to the corresponding pick up input line of stage one as indicated at 48. The back shunt circuit to latching photoconductor 16–3, as indicated at 50 should also be completed to the appropriate shunt photoconductor 10–1 at stage one as indicated at 52.

While only two advance lines 38 and 40 are illustrated, it is apparent that three or more advance lines may be employed if desired. In such case, each stage includes photoconductor shunts for all advance lines except the one which is next to be effective.

As previously mentioned above, although the photo responsive devices as illustrated in the embodiment of this invention are referred to as "photoconductors" it should be emphasized that devices of this description as employed in the system of the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance; having photoresponsive properties. However, the term "photoconductor" and the like is used in this specification, keeping these qualifications in mind. In the description of the circuit for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance, photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. It will be appreciated that the circuits providing energization for lamps 20 through 28 and 36 may be of a complex nature and that the series impedances may therefore be remote from their input connections and in series with other circuit components which do not form part of this invention and are not shown. Although impedance values for the various circuit components are not specified, it will be understood that whenever operation is required to provide output illumination, the series impedances for the various neons will be so chosen as to result in a neon current in the order of one milliampere.

In order to simplify the drawings and make them clearer and more easily understood the lamp shunt and series impedances are omitted from the drawings, but it will be understood that such impedances are to be employed in the practical embodiments of the invention. Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

FIG. 2 is a schematic circuit diagram of a bi-stable or flip-flop circuit embodiment of the present invention. The circuit of FIG. 2 is very similar to the circuit of FIG. 1, as described above, and corresponding parts are similarly lettered. As suggested above, the ring circuit of FIG. 1 can be connected for recirculation by interconnecting the outgoing connections 46 and 48 and by interconnecting the outgoing connections 50 ad 52. These interconnections for recirculation have been added in FIG. 2 as shown at 54 and 56. The condition lamp 36, and the start lamps 22, 24, and 26, and associated photoconductors, have been omitted from the FIG. 2 modification. Also "set" and "reset" lamps 58 and 60 have been added to the FIG. 2 modification. As described more fully below, the circuits provided by 58–1 and 60–1 respectively associated with set and rest lamps 58 and 60 each control the flip-flop circuit of FIG. 2 to provide a selected one of the two possible outputs. For this purpose, it is to be seen that photoconductor 58–1 provides an energizing circuit which is similar to that provided by photoconductor 28–2, and photoconductor 60–1 provides an energizing circuit similar to that of photoconductor 28–1.

The only other modification of FIG. 2 over FIG. 1 is that the odd-numbered output connections have been combined as indicated at 64 to provide a common output A, and the even-numbered outputs have been combined in a common circuit indicated at 66 to provide an output B. Outputs A and B at the connections 64 and 66 provide the alternate or bi-stable outputs from the circuit of FIG. 2. Since the circuit of FIG. 2 is characterized as a bi-stable circuit or a flip-flop circuit, the advance lamp 28 will be referred to, in FIG. 2, as a "trigger" lamp.

The operation of the system of FIG. 2 under the control of the trigger lamp 28 is directly analogous to the operation of the system of FIG. 1. Thus, after the system is started by energization of the start lamp 20, the circuit will advance one stage at a time each time the trigger lamp 28 is given an input pulse. The operation of this circuit will thus progress to sucessively provide output one, output two, output three, and output four. After output four, the system will recirculate to provide output one again and so forth. It is apparent that because of the interconnections of outputs one and three in common circuit 64, and because of the interconnections of outputs two and four in common circuit 66, the ultimate output will be either an output A or an output B, alternating each time there is a trigger input at trigger lamp 28.

If a definite specified bi-stable output is required in response to a particular input, the input is applied either to the "set" lamp 58 or the "reset" lamp 60. An input to the set lamp 58 always results in an output B at output connection 66, while an input to the reset lamp 60 always results in an output A on output connection 64. If lamp 10 is illuminated and a "set" input is applied, the resultant energization through photoconductor 58–1 which is applied to bus 38 is effective through photoconductor 10–4 to illuminate lamp 12 and thus shift the circuit. The output two from this stage is effective at common output B at connection 66. If a "set" input is again applied to lamp 58, the resultant energization on bus 38 has no effect, because bus 38 is grounded through photoconductor 12–2, so that the circuit does not change state and the output B continues. However, if a "reset" input is applied by illumination of lamp 60, the resultant input applied through photoconductor 60–1 to bus 40 is effective through photoconductor 12–4 to illuminate the lamp 14 to thus shift the circuit to provide an output three resulting in an output A on connection 64. An immediately succeeding "reset" signal on lamp 60 will not be effective to change the state of the circuit because the bus 40 is grounded through photoconductor 14–2. For this reason, the structure of FIG. 2 is appropriately characterized as a flip-flop circuit, or a bi-stable circuit, even though it is basically constructed from a four stage ring. Thus, it is apparent that after a "set" input an output B will always result because, if the circuit is in the condition where lamp 12 or 16 is illuminated, no shift will occur, but if lamp 10 or 14 is illuminated, a one position shift to lamp 12 or 16 will occur. Similarly, a "reset" input will always result in an output A, for if lamp 10 or 14 is illuminated, no shift will occur, but if lamp 12 or 16 is illuminated a one position shift will occur to either lamp 14 or lamp 10.

While the present invention has been described and illustrated with an embodiment employing lamps and photoconductors, it will be understood that other circuit technologies and devices may likewise be employed for embodying this invention. The lamp photoconductor devices are preferred, however. These combinations possess the advantages that the only coupling between the lamp and photoconductor is by means of the light emanating from the lamp to the photoconductor. There need be no common electrical connection between the two devices. The combination of the two devices may therefore be referred to as a four terminal device, signifying two terminals for the lamp and two terminals for the photoconductor. Other devices may be similary characterized. For instance, a relay is a four terminal device. The complete electrical isolation between the lamp and the photoconductor is a tremendous advantage in promoting reliable operation without undesirable coupling.

While the invention has been particularly shown and described with reference to a preferred embodiment, it will be understood that various other changes in form and detail may be made without departing from the spirit and scope of the invention.

What is claimed is:

1. A multi-stable circuit comprising a plurality of storage devices including at least one storage device for each stable state; a starting device for energizing at least one said storage device in response to an individual start signal; means for connecting said starting device to said storage devices; a single voltage supply; at least two advance pulse lines for supplying advance pulse signals from said single voltage supply to said multi-stable circuit whenever an advance to a new stable state is required; means for connecting said single voltage supply to said advance pulse lines; each of said storage devices including a pick up switch element operably responsive to the energization of said storage device for energizing the next succeeding storage device; means for connecting said pick-up switch element to the next succeeding storage device and to an advance line other than the advance line connected to the preceding storage device; and each of said storage devices including switch elements for disabling the other advance lines.

2. A multi-stable circuit comprising a plurality of storage devices including at least one storage device for each stable state, said storage devices being arranged for sequential operation; a starting device for energizing at least one of said storage devices in response to an individual start signal; means for connecting said starting device to said storage devices; a single voltage supply; at least two advance pulse lines for supplying advance pulse signals to said circuit whenever an advance to a new state is required; means for connecting said single voltage supply to said advance pulse lines; each of said storage devices including a pick-up switch element operably responsive to the energization of said storage device for energizing the next succeeding storage device; means for connecting said pick-up switch element to the next succeeding storage device and to an advance line other than the advance line connected to the preceding storage device; each storage device including a source of power and a latching switch element for connecting said source of power to maintain energization of said storage device when once picked up; and each storage device including a further switch element for disabling the last preceding storage device.

3. A ring circuit comprising a plurality of storage devices including at least one storage device for each ring position; a starting device for at least one of said ring positions for energizing said storage device in said ring position in response to an individual start signal; means for connecting said starting device to staid storage device; a single voltage supply; at least two advance pulse lines for supplying advance pulse signals from said single voltage supply to said ring circuit whenever an advance of the ring is required; means for connecting said single voltage supply to said advance pulse lines; each of said storage devices including a pick-up switch element for energizing the next succeeding ring position storage device; means for connecting said pickup switch element to the next succeeding storage device and to an advance line other than the advance line connected to the preceding storage device; and each of said storage devices including switch elements for disabling the other advance lines.

4. A ring circuit comprising a plurality of storage devices including at least one storage device for each ring position; a starting device for each ring position for energizing the storage device in said last mentioned ring position in response to an individual start signal; means for connecting said starting device to said storage device; a single voltage supply; at least two advance pulse lines for supplying advance pulse signals from said single voltage supply to said ring circuit whenever an advance of the ring is required; means for connecting said single voltage supply to said advance pulse lines; each of said storage devices including a pick-up switch element operably responsive to the energization of said storage device for energizing the next succeeding ring position storage device; means for connecting said pick-up switch element to the next succeeding ring position storage device and to an advance line other than the advance line connected to the preceding storage device; each of said storage devices including switch elements for disabling the advance line connected to the preceding storage device; each storage device including a latching switch element for maintaining said storage device energized when once picked up; and each storage device including a further switch element for disabling the latch circuit of the last preceding ring position storage device.

5. A multi-stable circuit comprising a plurality of storage devices including at least one storage device for each stable state, said multistable circuit being operable for energization of said storage devices in sequence; a starting circuit for energizing at least one of said storage devices in response to an initial input; means for connecting said starting device to said storage devices; a single voltage supply; each of said storage devices including a latching switch device operably responsive to said storage device for connecting power to said storage device and for maintaining said storage device in an energized state; each of said storage devices having a succeeding storage device in said sequence including a pick-up switch element for supplying a pick-up pulse of power to said succeeding storage device when the circuit is to be advanced to a new state; each of said storage devices having a preceding storage device in said sequence including a switch element for de-energizing said preceding storage device; at least two advance pulse lines for providing advance pulse voltages simultaneously from said single voltage supply whenever an advance is required; means for connecting said single voltage supply to said advance pulse lines; means for connecting said pick-up switch element to the next succeeding storage device and to an advance line other than the advance line connected to the preceding storage device; and a further disabling switch element included within each storage device having a second succeeding storage device for disabling the advance line which picks up said second succeeding storage device.

6. A ring circuit comprising a plurality of storage devices including at least one storage device for each ring position; a starting circuit for at least one of said ring positions for energizing the storage device in said ring position in response to an initial input; means for connecting said starting circuit to said storage devices; a single voltage supply; each of said storage devices including a latching switch device operably responsive to said storage device for connecting power to said storage device for maintaining said storage device in an energized condition; each of said storage devices for each ring position having a succeeding ring position storage device including a pick up switch element for supplying a pick up pulse of power to said succeeding storage device when the ring is to be advanced; each of said storage devices for each ring position having a preceding ring position including a switch element for deenergizing said preceding ring position storage device; and at least two advance pulse lines for providing advance pulse voltages from said single voltage supply by simultaneously switching whenever an advance of the ring is required; means for connecting said pick-up switch element to the next succeeding storage device and to an advance line other than the advance line connected to the preceding storage device.

7. A photologic sequentially operable multi-state circuit comprising a plurality of storage devices including at least one storage lamp for each state; a starting circuit for energizing at least one of said storage lamps in response to a start signal; means for connecting said starting circuit to said storage devices; a single voltage supply; at least two advance pulse lines for supplying advance pulse signals from said single voltage supply to said multistate circuit whenever an advance to a new state is required; means for connecting said single voltage supply to said advance lines; each of said storage lamps having a pick up photoconductor operably responsive to illumination from said storage lamps for energizing the next succeeding storage lamp; means for connecting said pick-up photoconductor to the next succeeding storage lamp and to an advance line other than the advance line connected to the preceding storage lamp; and each of said storage lamps having other photoconductors operably responsive to said storage lamps for disabling the advance connected to said preceding storage lamp.

8. A photologic sequentially operable multi-state circuit comprising a plurality of storage lamps including at least one storage lamp for each state; a starting circuit for energizing at least one of said storage lamps in response to an initial input; means for connecting said starting circuit to said storage lamps; a single voltage supply; each of said storage lamps having a latching photoconductor operably responsive to illumination from said storage lamp for connecting power to said storage lamp and for maintaining said storage lamp in an energized state; each of said storage lamps having a succeeding storage lamp including a pick up photoconductor operably responsive to illumination from said storage lamp for supplying a pick up pulse of power to the storage lamp of said succeeding ring position when the ring is to be advanced; each of said storage lamps having a preceding storage lamp in said sequence having a photoconductor operably responsive to illumination from said storage lamp for de-energizing said preceding storage lamp; at least two advance pulse lines for providing advance pulse voltage changes from said single voltage supply whenever an advance of the circuit is required; means for connecting one said advance pulse line to the last preceding storage lamp; and means for connecting said pick-up photoconductor to an advance line other than the advance line connected to the preceding storage lamp.

9. A photologic ring circuit comprising a plurality of storage lamps including at least one storage lamp for each ring position; a starting circuit for at least one of said ring positions for energizing the storage lamp in said ring position in response to a start signal; means for connecting said starting circuit to said storage lamps; a single voltage supply; at least two advance pulse lines for supplying advance pulse signals from said single voltage supply to said ring circuit whenever an advance of the ring is required; means for connecting said single voltage supply to said advance pulse lines; each of said storage lamps having a pick up photoconductor operably responsive to the illumination from said storage lamp for energizing the next succeeding ring position storage lamp; means for connecting one said advance line to the preceding storage lamp; means for connecting said pick-up photoconductor to the next succeeding storage lamp and to an advance line other than the advance line connected to the preceding storage lamp; and each of said storage lamps having other photoconductors operably responsive to said storage lamps for disabling the other advance lines.

10. A photologic ring circuit comprising a plurality of storage lamps including at least one storage lamp for each ring position; a starting circuit for each ring position for energizing the storage lamp in said ring position in response to an individual start signal; means for connecting said starting circuit to said storage lamps; a single voltage supply; at least two advance pulse lines for supplying advance pulse signals from said single voltage supply to said ring circuit whenever an advance of the ring is required; means for connecting said single voltage supply to said advance pulse lines; each of said storage lamps having a pick-up photoconductor operably responsive to illumination from said storage lamp to energize the next succeeding ring position storage lamp; means for connecting one said advance pulse line to a preceding storage lamp; means for connecting said pick-up photoconductor to the next succeeding storage lamp and to an advance line other than the advance line connected to the preceding storage lamp; each of said storage lamps having other photoconductors associated therewith for disabling the other advance pulse lines; each storage lamp also having a latching photoconductor operably responsive to illumination from said storage lamp for connecting a source of power to said storage lamp for maintaining said storage lamp in an energized state; and each storage lamp having a further associated photoconductor for disabling the latch connection of the last preceding ring position storage lamp; each photoconductor being arranged to receive illumination from one said storage lamp to achieve a low impedance state in response to illumination from said storage lamp.

11. A photologic ring circuit comprising a plurality of storage lamps including at least one storage lamp for each ring position; a starting circuit for at least one of said ring positions for energizing the storage lamp in said ring position in response to an initial input; means for connecting said starting circuit to said storage lamps; a single voltage supply; each of said storage lamps having a latching photoconductor operably responsive to illumination from said storage lamp for connecting power to said storage lamp and for maintaining said lamp in an energized condition; each of said storage lamps for each ring position having a succeeding ring position including a pick-up photoconductor operably responsive to illumination from said storage lamp to supply a pick-up pulse of power to the storage lamp of said succeeding ring position when the ring is to be advanced; each of said storage lamps for each ring position having a preceding ring position having a photoconductor operably responsive to illumination from said storage lamp for de-energizing said preceding ring position storage lamp; at least two advance pulse lines for providing advance pulse voltages from said single voltage supply simultaneously whenever an advance of the ring is required; means for connecting said single voltage supply to said advance pulse lines; means for connecting one said advance pulse line to a preceding storage lamp; means for connecting said pick-up switch elements in the next succeeding storage lamp to an advance line other than the advance line connected to the preceding storage lamp; said advance lines being connected in repeating sequence to said pick-up photoconductors of the storage lamps of successive ring positions, and a disabling photoconductor receiving illumination from the storage lamp for each ring position having a second succeeding ring position for disabling the advance line which energizes the storage lamp of said second succeeding ring position storage device.

12. A bi-stable circuit comprising a plurality of storage devices including at least two storage devices for each stable state arranged for operation in an alternating sequence; a starting circuit for energing one of said storage devices in response to an initial input; means for connecting said starting circuit to said storage devices; a single voltage supply; each of said storage devices including a latching switch device operably responsive to the energization of said storage device for maintaining said storage device in an operable condition; each of said storage devices including a pick-up switch element for supplying a pick up pulse of power to the next succeeding storage device in the sequence when the circuit is to be shifted to the other stable state; each of said storage devices including a switch element for de-energizing the last preceding storage device in said sequence; means for connecting said last mentioned switch element to said last preceding storage devices; two advance pulse lines for providing voltage changes simultaneously from said single voltage supply whenever a change of state is required; means for connecting said advance pulse lines to said single voltage supply; means for connecting one said advance pulse line to a preceding storage device; means for connecting each said pick-up switch element to the next succeeding storage device and to an advance pulse line other than the advance pulse line connected to the preceding storage device; a set input device for energizing only one of said advance pulse lines; means for connecting said set input to said one advance pulse line; a reset input device for energizing only the other of said advance pulse lines; and means for connecting said reset input device to said other of said advance pulse lines.

13. A photologic bi-stable circuit comprising a plurality of storage devices including at least two storage lamps for each stable state arranged for operation in a repeating alternating sequence; a starting circuit for energizing one of said storage lamps in response to an initial input; means for connecting said starting circuit to said storage lamps; a single voltage supply; each of said storage lamps having a latching photoconductor operably responsive to illumination from said storage lamp for connecting power to said storage lamp and for maintaining said lamp in an energized state; each of said storage lamps including a pick up photoconductor operably responsive to illumination from said storage lamp and connected to supply a pick up pulse of power to the next succeeding storage lamp in the sequence when the circuit is to be shifted to the other stable state; each of said storage lamps having a photoconductor operably responsive to illumination from said storage lamp for de-energizing the preceding ring position storage lamp; means for connecting said last mentioned photoconductor to said preceding ring position storage lamp; two advance pulse lines for providing voltage changes simultaneously from said single voltage supply whenever a change of state is required; means for connecting said advance pulse lines to said single voltage supply; means for connecting one said advance pulse line to a preceding storage lamp; means for connecting each said pick up photoconductors to the next succeeding storage lamp and to an advance pulse line other than the advance pulse line connected to the preceding storage device; a separate output photoconductor in operable relationship to illumination from each storage lamp; means for connecting the output photoconductors of each state to a common output circuit; a lamp-photoconductor set input device for energizing only one of said advance pulse lines; means for connecting said lamp photoconductor set input device to said one of said advance pulse lines; a lamp-photoconductor reset input device for energizing only the other of said advance pulse lines; and means for connecting said lamp photoconductor reset input device to said other of said advance pulse lines.

14. A bi-stable circuit comprising a plurality of storage devices including at least two storage devices for each stable state arranged for operation in an alternating sequence; a starting circuit for energizing one of said storage devices in response to an initial input; means for connecting said starting circuit to said storage devices; a single voltage supply; each of said storage devices including a latching switch device operably responsive to the energization of said storage device for maintaining said storage device in an operable condition; each of said storage devices including a pick up switch element for supplying a pick up pulse of power to the next succeeding storage device in the sequence when the circuit is to be shifted to the other stable state; each of said storage devices including a switch element for de-energizing the last preceding storage device in said sequence; means for connecting said last mentioned switch element to said last preceding storage device; two advance pulse lines for providing pulse voltages simultaneously from said single voltage supply whenever a change of state is required; means for connecting said advance pulse lines to said single voltage supply; means for connecting one said advance pulse line to a preceding storage device; means for connecting each said pick up switch element to the next succeeding storage device and to an advance pulse line other than the advance pulse line connected to the preceding storage device; a disabling switch element operably responsive to illumination from each storage device for disabling the advance pulse line which picks up the second succeeding storage device; a set input device for energizing only one of said advance pulse lines; means for connecting said set input device to said one advance pulse line; a reset input device for energizing only the other of said advance pulse lines; and means for connecting said reset input device to said other said advance pulse line.

15. A photologic bi-stable circuit comprising a plurality of storage lamps including at least two storage lamps for each stable state arranged for operation in a repeating alternating sequence; a starting circuit for energizing one of said storage lamps in response to an initial input; means for connecting said starting circuit to said storage lamps; a single voltage supply; each of said storage lamps having a latching photoconductor operably responsive to the energization of said storage lamp for maintaining said storage lamp in an operable condition; each of said storage lamps including a pick up photoconductor operably responsive to illumination from said storage lamp for supplying a pick up pulse of power to the next succeeding storage lamp in the sequence when the circuit is to be shifted to the other stable state; each of said storage lamps having a photoconductor operably responsive to illumination from said storage lamp for de-energizing the preceding ring position storage lamp; means for connecting said last mentioned photoconductor to said last preceding ring position storage lamp; two advance pulse lines for providing pulse voltages simultaneously from said single voltage supply whenever a change of state is required; means for connecting said advance pulse lines to said single voltage supply; means for connecting one said advance pulse line to a preceding storage lamp; means for connecting each to said pick up photoconductors to the next succeeding storage lamp and to an advance pulse line other than the advance pulse line connecting to the preceding storage lamp; a separate disabling photoconductor operably responsive to illumination from each storage lamp for disabling the advance pulse line which energizes the second succeeding storage device; a separate output photoconductor operably responsive to illumination from each storage lamp; means for connecting the output photoconductors for each state to a common output circuit; a lamp-photoconductor set input device for energizing only one of said pulse lines; means for connecting said set input device to said one advance pulse line; a lamp-photoconductor reset input device for energizing only the other of said advance pulse lines; and means for connecting said reset input device to said other of said advance pulse lines.

References Cited by the Examiner

UNITED STATES PATENTS

| | | | |
|---|---|---|---|
| 2,727,683 | 12/1955 | Allen et al. | 250—209 X |
| 2,949,538 | 8/1960 | Tomlinson | 250—213 |
| 2,985,763 | 5/1961 | Ress | 250—208 |
| 2,997,596 | 8/1961 | Vize | 250—209 |
| 3,020,410 | 2/1962 | Bowerman | 250—213 X |

RALPH G. NILSON, *Primary Examiner.*

WALTER STOLWEIN, *Examiner.*